United States Patent [19]
Kitamori et al.

[11] 3,737,697
[45] June 5, 1973

[54] COMMUTATOR MOTOR

[75] Inventors: Teruaki Kitamori, Hirakata; Naozi Takeda, Osaka, both of Japan

[73] Assignee: Matsushita Electric Industrial Co., Ltd., Osaka, Japan

[22] Filed: Sept. 30, 1971

[21] Appl. No.: 185,371

Related U.S. Application Data

[63] Continuation of Ser. No. 12,021, Feb. 17, 1970, abandoned.

[52] U.S. Cl..................................310/207, 310/268
[51] Int. Cl..............................................H02k 3/76
[58] Field of Search...................310/154, 207, 268

[56] References Cited
UNITED STATES PATENTS

| | | |
|---|---|---|
| 3,096,455 | 7/1963 | Hahn....................................310/268 |
| R25,305 | 12/1962 | Haydon................................310/268 |
| 3,487,246 | 12/1969 | Long....................................310/154 |
| 3,054,011 | 9/1962 | Silverschotz........................310/268 |
| 3,308,322 | 3/1967 | Hahn....................................310/268 |
| 3,296,474 | 1/1967 | Henry-Baudot..................310/207 X |

Primary Examiner—D. F. Duggan
Attorney—Stevens, Davis, Miller & Mosher

[57] ABSTRACT

An axial gap type commutator motor including a disklike armature winding formed by laminating a plurality of armature elements each having spiral coils consisting of a flat strip conductor formed by means of a printed-circuit technique or punching which are provided on the fore and rear surfaces of a doughnut-like thin insulating film, with insulating sheets being interposed therebetween, said armature being connected with a plate-like commutator.

1 Claim, 7 Drawing Figures

PATENTED JUN 5 1973

T. KITAMORI
AND
N. TAKEDA
INVENTORS

BY STEVENS, DAVIS, MILLER AND
MOSHER
ATTORNEYS

COMMUTATOR MOTOR

This is a continuation, of application Ser. No. 12,021, filed Feb. 17, 1970 now abandoned.

This invention relates to an axial gap commutator motor of the disk-like armature type.

The motor according to the present invention is advantageous in that the number of connection points is reduced by the use of spiral coils and that the rated voltage can be increased because of the fact that the number of series conductors between the brushes is increased by the use of a laminated armature.

Furthermore, the armature according to the present invention is constructed in such a unique manner that the laminated armature widing is connected with the separately manufactured commutator, and the connection of said armature winding with said commutator is made in the form of a wave winding despite the spiral shape of the armature winding. Therefore, it is possible for the designer to freely select the construction of the commutator, number and material of the commutator bars, and number of poles and number of laminated pieces of the armature according to the design purpose. This constitutes a great advantage from the standpoint of motor designing work.

Other objects, features and advantages of the present invention will become apparent from the following description taken in conjunction with the accompanying drawings, in which.

Figure 1:
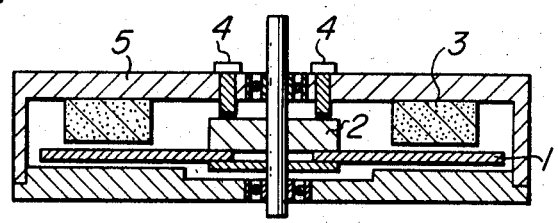
FIG. 1 is a cross-sectional view of the disk-like armature motor according to the present invention.
Figure 2:
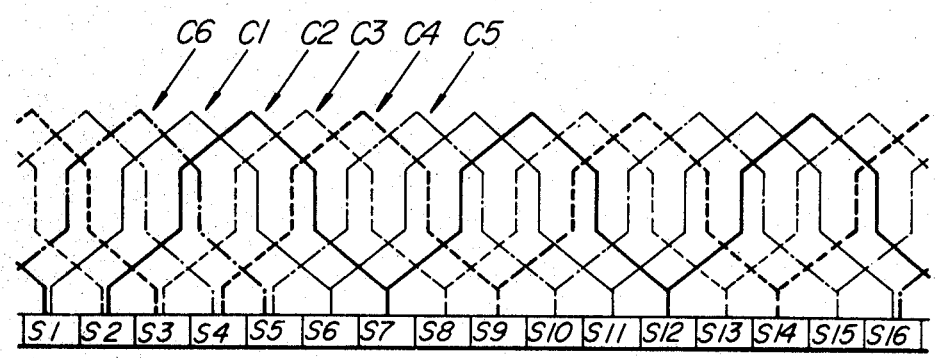
FIG. 2 is a connection diagram of the winding of a 6-pole, 16-piece commutator segment.

Referring first to FIG. 1, numeral 1 represents a disk-like armature, 2 a plate-like commutator, 3 a field magnet, 4 and 4' brushes respectively, and 5 a casing. As described above, the armature has a high freedom of selection for the number of poles, number of laminates, number of commutator bars and so forth, but description will hereinbelow be made of a 6-pole, 16-piece commutator by way of example. FIG. 2 is a connection diagram of the winding for the 6-pole, 16-piece commutator segment. As will be seen from this Figure, the winding may be divided into six coils as represented by C1 to C6, that is, coil C1 starting with a commutator bar S1 and terminating at S16 as indicated by a fine solid line; coil C2 starting with S2 and terminating at S1 as indicated by a thick solid line; coil C3 starting with S3 and terminating at S2 as indicated by a fine broken line; coil C4 starting with S4 and terminating at S3 as indicated by a thick broken line; coil C5 starting with S5 and terminating at S4 as indicated by a fine alternate long and short dash line; and coil C6 extending from S16 to S5.

Figure 3A:
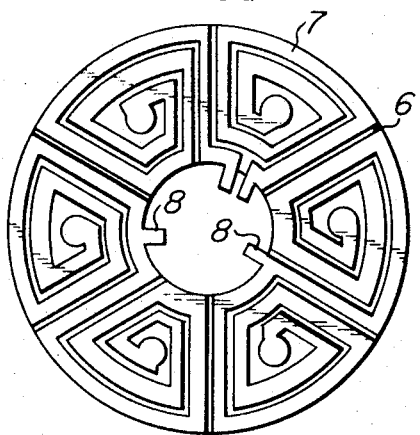
FIGS. 3a, 3b and 3c are a top plan view, front sectional view and bottom plan view of the armature according to the present invention, respectively.
Figure 3C:
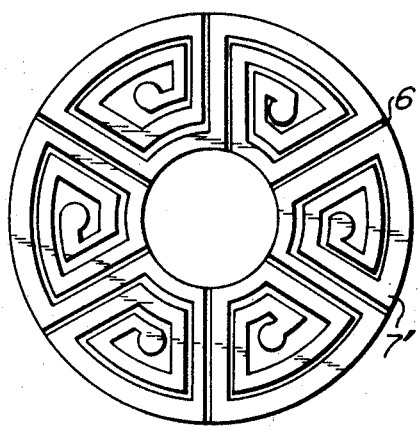
Figure 3B:
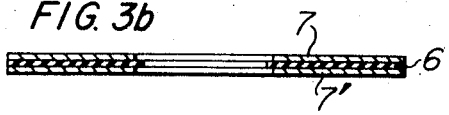

In the electric motor embodying the present invention, the aforementioned six coils C1 to C6 are configured in a single armature element, and such armature elements are staggered from each other through an angle of 360°/16 and laminated so as to constitute an armature coil. The external appearance and construction of each armature element is as shown in FIG. 3, wherein spiral coils 7 and 7' formed by means of a printed-circuit technique or punching are provided on the front and rear surfaces of a doughnut-like insulating film 6 respectively. The number of turns of each spiral coil is equal to the number of poles. The respective spiral coils are connected with each other at their centers through a small aperture formed in the insulating film 6. Inward projections 8 shown in FIG. 3a serve as terminals for connection with the commutator, and the number of such connecting terminals is $n/2 + 1$ where $n$ is the number of poles.

Figure 4:
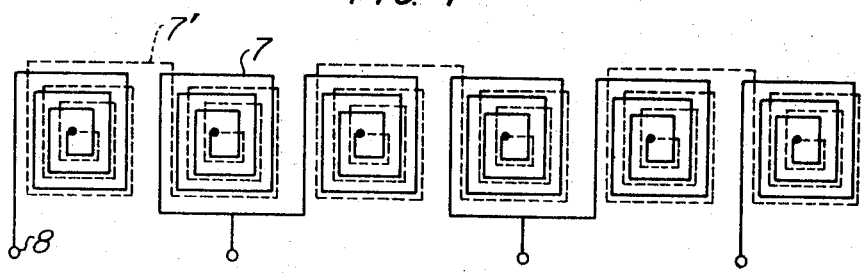
FIG. 4 is a view showing as developed in plan view the electrical connection of the armature elements shown in FIG. 3 for facilitating understanding thereof.

Referring now to FIG. 4, there is shown the electrical connection of the commutator elements as developed in plan view for facilitating understanding thereof, wherein solid lines 7 indicate the coils provided on the front surface of the insulating film, broken lines 7' the coils provided on the rear surface thereof, black dots at the centers of the respective coils the connection points of these coils, and white dots 8 the terminals for connection with the aforementioned commutator. As described above, each armature element is constructed in the form of a six-piece laminate, and each of these six pieces is configured in the same pattern. The coils C1 to C5 are configured in the same pattern, as will be readily apparent from the connection diagram shown in FIG. 2, but the coil C6 extends only between S16 and S5 and the length thereof is one-third of that of the remaining ones. In the laminated armature of the present invention, however, the coil C6 is configured in the same pattern as the remaining coils. Thus, coil 6 turns out to be a complete coil which starts with S16 and terminates at S15, so that the winding portion between S5 and S10 and that between S10 and S15 are connected in parallel with each other as indicated by long and short dash lines. Such parallel winding portions will have no adverse effect upon the electrical characteristics of the motor. Rather, such parallel winding portions will advantageously reduce the impedance of the entire winding.

As described above, in accordance with the present invention, all the armature elements of the armature winding are configured in the same pattern. This is advantageous in that the number of patterns can be reduced, and that the weight balance of the armature can easily be secured. The use of such a plate-like commutator as shown in FIG. 1 is advantageous in respect of the conservation of space.

Furthermore, the use of the commutator manufactured independently of the armature winding in accordance with the present invention constitutes an advantage in that the type, thickness and configuration of the commutator metal can be selected irrespective of the material of the armature conductor.

Figure 5:
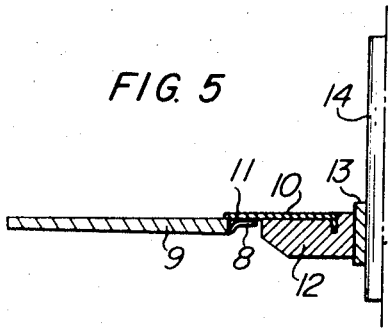
FIG. 5 is a front sectional view of support means for the armature according to the present invention.

Referring to FIG. 5, there is shown the connection between the armature winding and the commutator, wherein numeral 9 represents a disk-like armature winding formed by laminating armature elements, and 10 commutator bar the fore end of which is bent so as to constitute means for preventing the removal of a commutator sleeve 12 molded of plastic material. Numeral 8 indicates the terminal of the armature winding which is adapted for connection with the commutator as described above in connection with FIG. 3. This terminal may be spot-welded or soldered to the commutator segment 10 at a position 11. Numeral 13 represents a commutator boss disposed in engagement with a shaft 14.

Being constructed as described above, the electric motor embodying the present invention can be designed while being freed from any other constraining condition other than the general rule for wave winding with respect to the relationship among the number of poles, the number of laminated layers and the number of commutator segments, so that there is much freedom for the selection of designs according to the purpose intended by the designer, enabling great industrial utility to be achieved.

We claim:

1. An axial gap type commutator motor provided with a disk-like armature having a multi-layered conductor of at least four layers, comprising an armature winding including conductors affixed to a plurality of disk-like armature elements, said plurality of armature elements being laminated and disposed in a successively staggered relationship with each other through an angle corresponding to one commutator segment, with an insulating film interposed therebetween; each of said armature elements, each one of which comprises one round of a wave winding and cannot become a completed armature winding by itself, including spiral coils consisting of a flat strip printed-circuit conductor, said coils being provided on the front and rear surfaces of a disk-like insulating film, the number of coils on each one surface of said insulating film being $n$, where $n$ is the number of field poles on the motor;

said spiral coils provided on the front and rear surface of said insulating film being connected with each other at their centers through small apertures formed in the insulating film;

all said spiral coils being connected in series with each other; and each of said armature elements being provided on the inner peripheral edge thereof with inwardly projecting terminals adapted for connection with the commutator, said winding and said commutator being connected by welding, and the number of said terminals being $n/2 + 1$.

* * * * *